United States Patent [19]

Hussein et al.

[11] Patent Number: 5,084,298

[45] Date of Patent: Jan. 28, 1992

[54] SAVORY FLAVORED NONSWEET COMPOSITIONS USING NONSWEET CARBOHYDRATE BULKING AGENTS

[75] Inventors: Mamoun M. Hussein, Mountain Lakes; Carolina Militescu, Flanders; Frank J. Bunick, Budd Lake; Alan Moskowitz, Succasunna, all of N.J.

[73] Assignee: Warner-Lambert Company, Morris Plains, N.J.

[21] Appl. No.: 691,666

[22] Filed: Apr. 25, 1991

Related U.S. Application Data

[63] Continuation of Ser. No. 576,118, Aug. 23, 1990, abandoned, which is a continuation of Ser. No. 222,599, Jul. 21, 1988, abandoned.

[51] Int. Cl.$^5$ .................... A23G 3/30; A23G 1/0522
[52] U.S. Cl. .................... 426/658; 426/660; 426/661; 426/804; 426/808; 426/3
[58] Field of Search ............ 426/658, 660, 804, 808, 426/3

[56] References Cited

U.S. PATENT DOCUMENTS

| | | | |
|---|---|---|---|
| 3,974,032 | 8/1976 | Harjes et al. | 426/658 |
| 3,974,033 | 8/1976 | Harjes et al. | 426/658 |
| 3,974,034 | 8/1976 | Horn et al. | 426/658 |
| 4,024,290 | 5/1977 | Layton | 426/658 |
| 4,382,963 | 5/1983 | Klose et al. | 426/658 |
| 4,597,981 | 7/1986 | Kastin | 426/658 |

*Primary Examiner*—Jeanette Hunter
*Attorney, Agent, or Firm*—Charles A. Gaglia; Richard S. Bullitt, Jr.

[57] ABSTRACT

The present invention pertains to a savory flavored nonsweet snack composition comprising a nonsweet carbohydrate bulking agent and a savory flavoring agent.

The present invention also pertains to a method for preparing a savory flavored nonsweet composition which comprises heating and mixing a nonsweet carbohydrate bulking agent at elevated temperatures, cooling the bulking agent to a temperature below about 120° C., admixing a savory flavoring agent with the bulking agent and forming the resulting mixture into a desired shape.

13 Claims, No Drawings

SAVORY FLAVORED NONSWEET COMPOSITIONS USING NONSWEET CARBOHYDRATE BULKING AGENTS

This is a continuation of copending application Ser. No. 576,118 filed on Aug., 23, 1990 now abandoned which is a continuation of copending application Ser. No. 222,599 filed on July 21, 1988 now abandoned.

BACKGROUND OF THE INVENTION

1. Field of the Invention

This invention relates to savory flavored nonsweet compositions. The invention also relates to methods by which these savory flavored nonsweet compositions may be prepared.

2. Description of the Prior Art

The use of sweet carbohydrates in foods as fillers or bulking agents is well established. However, above certain concentration levels, the sweetness of these carbohydrates becomes excessive. This excessive sweetness, which is not taste compatible with savory flavors, can also mask desirable flavors. In addition, consumption of large amounts of certain sweet carbohydrate fillers and bulking agents can result in high caloric intake and can promote dental decay.

Japanese patent 57,071,366 to Nobel discloses hard confectioneries with low sweetness. The confectioneries contain (1) 0–70% lactose, (2) 0–60% of a sugar selected from the group consisting of glucose, fructose, sorbitol, maltitol, isomerized sugar and honey, and (3) the remainder malt syrup and/or dextrin. Sweetness is said to be controlled by appropriate selection of the sugar or by addition of the nonnutritive sweetener agent stevioside. Nobel further states that savory flavors, not compatible with conventional compositions, may be combined with the low sweetness composition.

Japanese patent 61,254,148 to Ishi discloses low caloric candy compositions which consist of (1) polydextrose, (2) sugar alcohols such as sorbitol, maltitol, xylitol, and mannitol, and (3) a flavoring agent.

U.S. Pat. No. 4,562,079 to Herzing discloses savory confection-like coatings for snack foods. The savory coatings consist of (1) a matrix of hard butter, (2) a flavoring agent, and (3) a particulate base material mixed in the hard butter matrix composed of bland carbohydrate and/or protein components.

Accordingly, there is a need for snack food compositions which are not sweet and which do not mask desirable flavors. Since typical savory flavored compositions are high in calories and may promote the formation of cavities, there is also a need for savory flavored snack foods which are low in calories and are noncariogenic.

SUMMARY OF THE INVENTION

The present invention pertains to a pleasant tasting savory flavored nonsweet composition comprised of a nonsweet carbohydrate bulking agent and a savory flavoring agent.

The present invention also pertains to a method for preparing a savory flavored nonsweet composition which comprises heating a nonsweet carbohydrate bulking agent at elevated temperatures, cooling the bulking agent to a temperature below about 120° C., admixing a savory flavoring agent with the bulking agent, and forming the resulting mixture into a desired shape.

DETAILED DESCRIPTION OF THE INVENTION

Applicants have discovered that compositions which simulate the taste of savory flavored snacks may be prepared from a nonsweet carbohydrate bulking agent and a savory flavoring agent. The compositions of the present invention are different from conventional candy-like compositions because they are devoid of sweetness. Depending upon the carbohydrate bulking agent employed, the savory flavored compositions can provide fewer calories than the snacks they simulate. Furthermore, use of noncariogenic nonsweet carbohydrate bulking agents can provide dental benefits.

In a preferred embodiment, the savory flavored nonsweet compositions of the present invention comprise in percentages by weight (1) a nonsweet carbohydrate bulking agent in an amount from about 95.0% to about 99.98% and (2) a savory flavoring agent in an amount from about 0.02% to about 5.0%. In a most preferred embodiment, the compositions comprise in percentages by weight (1) a nonsweet carbohydrate bulking agent in a amount from about 98.0% to about 99.9% and (2) a savory flavoring agent in an amount from about 0.1% to about 2.0%. In addition, salt may be optionally added to the composition in an amount up to about 2%, and preferably from about 0.1% to about 0.5%, by weight of the composition.

The nonsweet carbohydrate bulking agents of the present invention must be sufficient in physical make-up to provide adequate bulk and texture to the composition. In addition, the carbohydrate bulking agents must contribute no sweetness or minimal sweetness to the composition. Suitable nonsweet carbohydrate bulking agents include nonsweet or low sweet hydrogenated starch hydrolysates, polymers of glucose, and other carbohydrates such as gum arabic, and other hydrocolloid gums, and mixtures thereof.

Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. The degree of polymerization (DP) of various hydrogenated starch hydrolysates is presented in Table 1.

Products high in percentages of monomer (DP1) and dimer (DP2) will have higher sweetness levels and produce softer confectionery products. Products high in percentages of polymers will have low sweetness and produce confectionery products that have a hard texture. DP-1, for example could stand for sorbitol, mannitol, xylitol or any other hydrogenated monosaccharide. DP-1 is generally sorbitol due to the natural abundance of glucose in the corn syrup starting material. Similarly, the percent DP-2 defines the amount of hydrogenated disaccharides such as maltitol present while DP-3, DP-4, DP-5... and so on define the amounts of higher hydrogenated saccharides present in the hydrogenated starch hydrolysate.

Preferably the hydrogenated starch hydrolysates used in the present invention will have a DP-1 value from about 5% to about 20%, a DP-2 value from about 5% to about 15%, and a DP-3 and DP-4 value of up to about 90%. Most preferably, the hydrogenated starch hydrolysate will have a DP-1 value from about 10% to about 15%, a DP-2 value from about 5% to about 10%, and a DP-3 and DP-4 value of up to about 85%.

TABLE 1

| Degree of Polymerization (DP) Value For Typical Hydrogenated Starch Hydrolysates | | | | | | |
|---|---|---|---|---|---|---|
| DP-1 | DP-2 | DP-3 | DP-4+ | DP-3-DP-6 | DP-6+ | DP-3+ |
| Lycasin* 6–8 | 50–55 | N.D.*** | N.D. | 20–25 | 15–20 | 35–45 |
| Hystar** HM-75 15 | 50 | 12 | 23 | | | 35 |
| Hystar 3375 14 | 18 | 10 | 58 | | | 68 |
| Hystar 4075 13 | 23 | 12 | 49 | | | 51 |
| Hystar 5875 7 | 60 | 11 | 22 | | | 33 |
| Hystar 6075 14 | 8 | 10 | 68 | | | 78 |

*Lycasin is a trademark of Roquette Corporation.
**Hystar is a trademark of Lonza, Inc.
***Not determined Suitable polymers of glucose include randomly bonded condensation polymers of D-glucose. The polymers of glucose useful herein include those polymers disclosed in U.S. Pat. No. 3,766,165. Preferred polymers of glucose include the randomly bonded condensation polymer of D-glucose manufactured under the trademark POLYDEXTROSE by Pfeizer, Inc. and the condensation polymer of dextrose manufactured under the tradename PULLULAN by Hayashibara Biochemical Laboratories Incorporated, Okayama, Japan. Many polymers of glucose have no sweetness and some are low in calories. Accordingly inclusion of these polymers into the present compositions lowers the caloric content of the savory flavored compositions.

Savory flavors are generally considered nonsweet flavors, that is salty and/or spicy flavors, although savory flavors may contain sweet components. Suitable savory flavoring agents include natural and artificial food flavors such as spices, herbs, seasonings, vegetables, cooked meats, cooked fish and seafood, cheese, yeast, protein hydrolysates, and smoke, both individual and mixed. Such flavoring agents include liquid and solid forms. Nonlimiting examples of savory flavors include beef, pork, ham, poultry, cheddar, mozzarella, gouda, onion, garlic, tomato, pepper, paprika, nutmeg, coriander, yeast, soya, nuts, dried food ingredients, and the like. Preferred savory flavoring agents are pizza flavor, tomato flavor, cheese flavor, onion flavor, garlic flavor, bacon bits flavor, crouton flavor, cereal flavor, fried chip flavor, fried vegetable flavor, poultry, meat, and fish flavors, Mexican flavors and mixtures thereof. Mexican flavors include jalapeno, nacho, chile, tamale and Mexican spice flavors and mixtures thereof. A general discussion of savory flavors may be found in B. Dunstan, *Food*, February 1988 at pp. 43–46 and H. Heath, *Food*, February 1988 at pp. 20–23, which disclosures are incorporated herein by reference.

Flavoring agents include compounds which modify taste perception. Particularly useful taste modifiers include the food acids. Suitable food acids include citric acid, fumaric acid, malic acid, ascorbic acid, tartaric acid, lactic acid, sorbic acid, and mixtures thereof.

The amount of savory flavoring agent employed is normally a matter of preference subject to such factors as the type of flavor, the type of bulking agent, and the strength of flavor desired. In general, the flavoring agent is present in amounts from about 0.02% to about 5.0%, by weight of the total composition. Preferably, the flavoring agent is present in amounts from about 0.1% to about 2.0%, by weight of the total composition.

Salt may also be optionally included in the savory flavored nonsweet compositions of the present invention. Suitable salts include sodium chloride, potassium chloride, ammonium chloride and mixtures thereof. Sodium chloride is the preferred salt. Salts when used are generally present in amounts up to about 2% by weight, and preferably from about 0.1% to about 0.5%, by weight of the final product.

In addition to the foregoing materials, the savory flavored nonsweet compositions of the present invention may also include further additives utilized conventionally to prepare candy and candy-like compositions. Thus the instant compositions may include materials selected from colorants, pigments, decolorants, oils, fats, preservatives, humectants, stickiness reducers, graining compounds, and so forth, and mixtures thereof, in varying amounts.

The colorants useful in the present invention are preferably water-soluble. A preferred pigment, titanium dioxide, may be incorporated in amounts up to about 1% by weight. Also, the colorants may include other dyes suitable for food, drug and cosmetic applications, and known as F.D.& C. dyes and lakes. A full recitation of all F.D.& C. colorants and their corresponding chemical structures may be found in the Kirk-Othmer Encyclopedia of Chemical Technology, 3rd edition, in Volume 6, at pages 561–595, which text is incorporated herein by reference. These pigments and colorants when used are generally present in amounts up to about 1%, by weight of the final composition, and preferably from about 0.01% to about 1%, by weight of the final composition.

The decolorants which may be incorporated into the present composition to prevent color changes due to aging include such compounds as sodium metabisulfite, ascorbic acid, and the like. Decolorants when used are generally present in amounts from about 0.05% to about 0.25%, by weight of the final product.

Suitable oils and fats include unsaturated oils, hydrogenated and partially hydrogenated vegetable and animal oils and fats, coconut oil, palm kernel oil, cottonseed oil, sunflower oil, soy oil, corn oil, beef tallow, lard, sucrose polyesters, polyethylene glycols and mixtures thereof. These ingredients when used are generally present in amounts up to about 10%, by weight of the final composition.

Suitable preservatives include butylated hydroxyanisole (BHA), butylated hydroxytoluene (BHT), benzoic acid, ascorbic acid, methylparaben, propylparaben, ethylene-diaminetetraacetic acid (EDTA), tocopherols and mixtures thereof. Preservatives when used are generally present in amounts up to about 1.0% by weight, and preferably from about 0.1% to about 1.0%, by weight of the final composition.

Suitable humectants include glycerin, sorbitol, fructose and mixtures thereof. Humectants when used are generally present in amounts up to about 5% by weight, and preferably from about 1.0% to about 5.0%, by weight of the final composition.

Suitable surface stickiness reducers include mono- and diglycerides, and mixtures thereof. The stickiness reducers when used are present in amounts up to about 1.0% by weight, and preferably from about 0.1% to bout 1.0%, by weight of the final composition.

The preparation of confectionery formulations is historically well known and has changed little through the years. Confectionery items have been classified as either "hard" confectionery or "soft" confectionery. The savory flavored nonsweet compositions of the present invention can be prepared in conventional hard and soft confections.

Savory flavored hard confectionery may be processed and formulated by conventional means. In general, a hard confectionery has a base composed of a mixture of carbohydrate bulking agents present in amounts from about 95.0% to about 99.8%, by weight of the final composition. Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating in a kettle until the bulking agent dissolves. Additional bulking agent may then be added and cooking continued until a final temperature of 145° to 156° C. is achieved. The batch is then cooled and worked as a plastic-like mass to incorporate additives such as flavors, colorants and the like.

A high-speed atmospheric cooker uses a heat-exchanger surface which involves spreading a film of candy on a heat exchange surface, the candy is heated to 165° to 170° C. in a few minutes. The candy is then rapidly cooled to 100° to 120° C. and worked as a plastic-like mass enabling incorporation of the additives, such as flavors, colorants and the like.

In vacuum cookers, the carbohydrate bulking agent is boiled to 125° to 132° C., vacuum is applied and additional water is boiled off without extra heating. When cooking is complete, the mass is a semi-solid and has a plastic-like consistency. At this point, flavors, colorants, and other additives are admixed in the mass by routine mechanical mixing operations.

The optimum mixing required to uniformly mix the flavors, colorants and other additives during conventional manufacturing of hard confectionery is determined by the time needed to obtain a uniform distribution of the materials. Normally, mixing times of 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets,* Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

Similar to hard confectionery, savory flavored soft confectionery may be utilized in this invention. The preparation of soft confections, such as nougat, involves conventional methods, such as the combination of two primary components, namely (1) a high boiling syrup such as a hydrogenated starch hydrolysate or the like and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent such as a hydrogenated starch hydrolysate. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, *Chocolate, Cocoa and Confectionery: Science and Technology,* 2nd edition, AVI Publishing Co., Inc., Westport, Conn. (1980), at pages 424–425, which disclosure is incorporated herein by reference.

The procedure for preparing the savory flavored soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

The present invention includes a savory flavored chewing gum composition and a method for preparing a savory flavored chewing gum composition, including both chewing gum and bubble gum formulations. As used herein, the term chewing gum product means a product containing a chewing gum formulation. In general, the chewing gum formulation will comprise from about 5% to about 99% by weight, and preferably from about 20% to about 95%, by weight of the savory flavored chewing gum product.

With regard to a chewing gum formulation, such formulations contain a gum base, a savory flavored nonsweet composition, and various additives. The gum base employed will vary greatly depending upon various factors such as the type of base desired, the consistency desired and the other components used to make the final chewing gum product. In general, the gum base will b present in amounts from about 5% to about 45%, by weight of the final chewing gum composition, and preferably in amounts from about 15% to about 25%, by weight of the final chewing gum composition. The gum base may be any water-insoluble gum base known in the art. Illustrative examples of suitable polymers in gum bases include both natural and synthetic elastomers and rubbers. For example, those polymers which are suitable as gum bases include, without imitation, substances of vegetable origin such as chicle, jelutong, gutta percha and crown gum. Synthetic elastomers such as butadiene-styrene copolymers, isobutylene-isoprene copolymers, polyethylene, polyisobutylene and polvinylacetate and mixtures thereof, are particularly useful.

The gum base composition may contain elastomer solvents to aid in softening the elastomer component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, the pentaerythritol ester of wood rosin, the glycerol ester of wood rosin, the glycerol ester of partially dimerized rosin, the glycerol ester of polymerized rosin, the glycerol ester of tall oil rosin, the glycerol ester of wood rosin and the partially hydrogenated wood rosin and the partially hydrogenated methyl ester of rosin such as polymers of alpha-pinene and beta-pinene; terpene resins including polyterpene and mixtures thereof. The solvent may be employed in amounts from about 10% to about 75% by weight, and preferably from about 45% to about 70%, by weight of the gum base.

The savory flavored nonsweet composition will comprise a nonsweet carbohydrate bulking agent and a savory flavoring agent. The nonsweet carbohydrate bulking agents and savory flavoring agents useful in this invention have been set out above. In general, the savory flavored nonsweet composition will be present in amounts from about 25% to about 75% by weight, and preferably from about 50% to about 65%, by weight of the final chewing gum composition.

A variety of traditional ingredients such as plasticizers or softeners such as lanolin, stearic acid, sodium stearate, potassium stearate, glyceryl triacetate, glycerine and the like as well as natural and synthetic waxes, petroleum waxes, such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts from about 3% to about 20%, by weight of the final gum base composition.

The chewing gum composition may additionally include the conventional additives of flavoring agents, coloring agents such as titanium dioxide, emulsifiers such as lecithin and glyceryl monostearate, and additional fillers such as aluminum hydroxide, alumina, aluminium silicates, calcium carbonate, talc and combinations thereof. These fillers may also be used in the gum base in various amounts. Preferably the amount of fillers when used will vary from about 4% to about 30%, by weight of the final chewing gum.

The colorants useful in the present invention include pigments which may be incorporated in amounts up to about 6% by weight of the composition. A preferred pigment, titanium dioxide, may be incorporated in amounts up to about 1% by weight. Also, the colorants may include other dyes suitable for food, drug and cosmetic applications and known as F.D.& C. dyes and lakes. The materials acceptable for the foregoing uses are preferably water-soluble. Illustrative examples include the indigo dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzyl-amino) diphenylmethylene]-[1-(N-ethyl-N-p-sulfoniumbenzyl)-2,5-cyclohexadieneimine]. A full recitation of all F.D.& C. colorants and their corresponding chemical structures may be found in the Kirk-Othmer Encyclopedia of Chemical Technology, 3rd Edition, in volume 6 at pages 561–595, which text is incorporated herein by reference.

Suitable oils and fats usable in the present composition include partially hydrogenated vegetable or animal fats, such as coconut oil, palm kernel oil, beef tallow, lard, and the like. These ingredients when used are generally present in amounts up to about 7.0% by weight, and preferably up to about 3.5%, by weight of the final composition.

The gum base is conventionally melted at temperatures that may range from about 60° C. to about 120° C. for a period of time sufficient to render the base molten. For example, the gum base may be heated under these conditions for a period of about thirty minutes just prior to being admixed with the remaining ingredients of the gum composition such as a savory flavored nonsweet compositions, coloring and the like. Mixing is continued until a uniform mixture of gum base is obtained. Thereafter the gum base mixture may be formed into desirable chewing gum shapes.

The savory flavored nonsweet compositions may be formulated with conventional ingredients which offer a variety of textures to suit particular applications. Such ingredients may be in the form of hard and soft confectioneries, tablets, toffee, nougat, chewy candy, chewing gum and so forth. The acceptable ingredients may be selected from a wide range of materials. Without being limited thereto, such materials include diluents, binders and adhesives, lubricants, disintegrants, bulking agents, humectants and buffers and adsorbents. The preparation of such confectioneries and chewing gum products is well known.

The present invention is further illustrated by the following examples which are not intended to limit the effective scope of the claims. All parts and percentages in the examples and throughout the specification and claims are by weight of the final composition unless otherwise specified.

EXAMPLE 1

Inventive Run 1

This Example demonstrates a method for preparing a savory flavored composition according to the process of the invention having the following composition.

| Ingredient | Percent by Weight |
| --- | --- |
| Hystar 6075 (Lonza, Inc.) | 99.50 |
| Mexican Nacho Flavor | 0.20 |
| Sodium Chloride | 0.30 |
| Total | 100.0 |

Hystar 6075 (Lonza, Inc.) and sodium chloride were heated and mixed in sufficient water to dissolve the components. Heating was continued until the temperature reached 145° C. After the mass was cooled to under 120° C., Mexican nacho flavor was admixed by folding the flavoring component into the mass. The mix was then formed into tablets.

The product was a savory flavored composition which had a pleasant Mexican nacho flavor.

EXAMPLE 2

Inventive Run 2

This Example demonstrates a method for preparing a savory flavored composition according to the process of the invention having the following composition.

| Ingredient | Percent by Weight |
|---|---|
| Polydextrose (Pfeizer, Inc.) | 99.50 |
| Mexican Nacho Flavor | 0.20% |
| Sodium Chloride | 0.30% |
| Total | 100.0 |

Polydextrose (Pfeizer, Inc.) and sodium chloride were heated and mixed in sufficient water to dissolve the components. Heating was continued until the temperature reached 145° C. After the mass was cooled to under 120° C., Mexican nacho flavor was admixed by folding the flavoring component into the mass. The mix was then formed into tablets.

The product was a savory flavored composition which had a pleasant Mexican nacho flavor.

The invention being thus described, it will be obvious that the same may be varied in many ways. Such variations are not to be regarded as a departure from the spirit and scope of the invention and all such modifications are intended to be included within the scope of the following claims.

We claim:

1. A savory flavored nonsweet snack composition comprising a nonsweet carbohydrate bulking agent nonsweet or low sweet hydrogenated starch hydrolysates, polymers of glucose, gum arabic, hydrocolloid gums and mixtures thereof in an amount from about 95.0% to about 99.98% and a savory flavoring agent in an amount from about 0.02% to about 5.0%.

2. The composition of claim 1 wherein the nonsweet carbohydrate bulking agent is present in an amount from about 98.0% to about 99.9% and the savory flavoring agent is present in an amount from about 0.1% to about 2.0%, by weight of the final composition.

3. The composition of claim 1 wherein the nonsweet carbohydrate bulking agent is a hydrogenated starch hydrolysate having a DP-1 value from about 5% to about 20%, a DP-2 value from about 5% to about 15%, and a DP-3 and DP-4 value of up to about 90%.

4. The composition of claim 3 wherein the hydrogenated starch hydrolysate has a DP-1 value from about 10% to about 15%, a DP-2 value from about 5% to about 10%, and a DP-3 and DP-4 value of up to about 85%.

5. The composition of claim 1 wherein the polymer of glucose is a randomly bonded condensation polymer of D-glucose.

6. The composition of claim 1 wherein the savory flavoring agent is selected from the group consisting of pizza flavor, tomato flavor, cheese flavor, onion flavor, garlic flavor, bacon bits flavor, crouton flavor, cereal flavor, fried chip flavor, fried vegetable flavor, poultry, meat, and fish flavors, and Mexican flavors such as jalapeno, nacho, chile, tamale and Mexican spice flavors and mixtures thereof.

7. The composition of claim 6 wherein the savory flavoring agent is a Mexican flavor such as jalapeno, nacho, chile, tamale and Mexican spice flavors and mixtures thereof.

8. A method for preparing a savory flavored nonsweet snack composition comprising a nonsweet carbohydrate bulking agent selected from the group consisting of nonsweet or low sweet hydrogenated starch hydrolysates, polymers of glucose, gum arabic, hydrocolloid gums and mixtures thereof in an amount from about 95% to about 99.98% and a savory flavoring agent in an amount from about 0.02% to about 5.0% which comprises:

heating and mixing the nonsweet carbohydrate bulking agent in water at elevated temperatures;

cooling the bulking agent to a temperature below about 120° C.;

admixing the savory flavoring agent with the bulking agent; and forming the resulting mixture into a desired shape.

9. The method of claim 8 wherein the nonsweet carbohydrate bulking agent is present in an amount from about 98.0% to about 99.9% and the savory flavoring agent is present in an amount from about 0.1% to about 2.0%, by weight of the final composition.

10. The method of claim 8 wherein the nonsweet carbohydrate bulking agent is a hydrogenated starch hydrolysate having a DP-1 value from about 5% to about 20%, a DP-2 value from about 5% to about 15%, and a DP-3 and DP-4 value of up to about 90%.

11. The method of claim 10 wherein the hydrogenated starch hydrolysate has a DP-1 value from about 10% to about 15%, a DP-2 value from about 5% to about 10%, and a DP-3 and DP-4 value of up to about 85%.

12. The method of claim 8 wherein the polymer of glucose is a randomly bonded condensation polymer of D-glucose.

13. The method of claim 8 wherein the flavoring agent is selected from the group consisting of pizza flavor, tomato flavor, cheese flavor, onion flavor, garlic flavor, bacon bits flavor, crouton flavor, cereal flavor, fried chip flavor, fried vegetable flavor, poultry, meat, and fish flavors, and Mexican flavors such as jalapeno, nacho, chile, tamale and Mexican spice flavors and mixtures thereof.

* * * * *